3,549,705
HEXAFLUOROISOPROPANOL ACRYLAMIDE
Elemer Domba, Olympia Fields, and Thaddeus A. Krolikiewicz, Westchester, Ill., assignors to Nalco Chemical Company, Chicago, Ill., a corporation of Delaware
No Drawing. Filed May 28, 1969, Ser. No. 828,786
Int. Cl. C07c 103/30
U.S. Cl. 260—561                    3 Claims

ABSTRACT OF THE DISCLOSURE

The new compound, hexafluoroisopropanol acrylamide, its polymers and method of manufacture.

---

This invention is directed to the new compound, N-hexafluoroisopropanol acrylamide, having the structural formula:

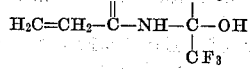

This invention is also directed to polymers prepared from this novel fluorine-containing monomer, as well as to a method for preparing this compound.

N-hexafluoroisopropanol acrylamide is prepared by reacting acrylamide with at least one mole of hexafluoroacetone at a temperature less than −27° C.

In a preferred embodiment of the invention the reaction is conducted in a glycol-ether solvent in which the starting acrylamide monomer is soluble. Such solvents are exemplified by the dimethyl ether of ethylene glycol.

The reaction is usually performed by dissolving the acrylamide monomer in the ethylene glycol ether solvent. This solution is then chilled to a temperature below 27° C. At this point hexafluoroacetone, a gas, is bubbled into the acrylamide solution over a period of time ranging between 5 minutes to about ½ hour. At the end of this time the reaction is complete. The time over which the hexafluoroacetone may be added to the acrylamide may be varied in relation to the temperature.

A preferred temperature for conducting the reaction is within the range of −40° to −8° C. with the lower temperatures being preferred since the hexafluoroacetone may be dissolved into the reaction system at a much faster rate.

To illustrate the preparation of N-hexafluoroisopropanol acrylamide, the following is presented:

EXAMPLE I

To a 3-necked reaction flask fitted with thermometer and a stirrer was added 100 mm. of the dimethyl ether ethylene glycol. To this was added 21.3 gr. (0.3 moles) of acrylamide. The reaction flask containing the dissolved acrylamide was then suspended in an acetone Dry Ice bath and chilled to a temperature of −40° C. To this reaction medium over 15-minute period was then added hexafluoroacetone. At the end of the addition of the hexafluoroacetone the flask was removed from the Dry Ice bath and allowed to warm to room temperature. At room temperature the finished product, e.g. N-hexafluoroisopropanol acrylamide, precipitated from the solvent and was in the form of a water-white clear liquid. The solvent was discarded and the monomer retained.

N-hexafluoroisopropanol acrylamide prepared in accordance with the above example is a useful monomer, capable of reacting either with itself to form homopolymers or with other vinyl monomers to produce polymers having a variety of useful applications.

In preparing both the homo and copolymers of N-hexafluoroisopropanol acrylamide, emulsion polymerization techniques are beneficially used with the catalyst system being a free radical-type catalyst. By using appropriate conditions and correct amounts and types of emulsifiers, it is possible to produce by well-known methods stable lattices of these polymers which are valuable as textile-treating agents.

Copolymers of N-hexafluoroisopropanol acrylamide, when they contain at least 5% by weight of this monomer, show valuable oil-and-waterproofing characteristics for a variety of surfaces, particularly textiles.

EVALUATION OF THE INVENTION

To illustrate the variety of polymers that may be prepared from N-hexafluoroisopropanol acrylamide, the following general polymerization technique was used. A standard 3-necked round-bottom laboratory flask was fitted with a stirrer reflux condenser and a nitrogen inlet. The flask was flushed with dry nitrogen for about 15 minutes prior to use. Nitrogen was continuously added thereto at a very slow rate. To the flask was then added a non-anionic emulsifying agent such as the various epoxylated and propoxylated sorbitols under the trade names of "Span" and "Tween." To the system was then added the appropriate amounts of N-hexafluoroisopropanol acrylamide and the particular monomer with which it was polymerized. After the monomers had been added, appropriate amounts of free radical catalysts are added to the system. Exceptionally good results have been achieved by using the free radical catalyst 2,2′-azodiisobutyronitrile and related azo-type catalysts.

The reaction system was cooled with ice water bath so that the reaction temperature did not exceed approximately 35°–60° C. After two to three hours following the addition of the catalyst quite milk-like emulsions are obtained, which are excellent water and oil proofing agents for textiles.

To illustrate the variety of polymers that may be prepared by the above generalized techniques, the following information is presented by way of additional examples in Table I below:

TABLE I

| Example No.: | N-hexafluoroisopropanol acrylamide %/wt. | Monomer | Catalyst |
|---|---|---|---|
| II | 100 | | Vazo * |
| III | 50 | Acrylonitrile | Do. |
| IV | 25 | Acrylamide | Do. |
| V | 80 | Maleic anhydride | Do. |
| VI | 50 | Vinyl chloride | Do. |
| VII | 75 | Vinyl acetate | t-Butyl hydroperoxide. |
| VIII | 50 | Isobutylene | Vazo. |
| IX | 80 | Acrylic acid | Do. |
| X | 60 | Methyl vinyl ether | Do. |
| XI | 80 | N-vinyl pyrrolidone | Do. |
| XI | 50 | Styrene | Do. |
| XIII | 85 | Diallylamine | Do. |

*2,2′-azodiisobutyronitrile.

It is noted in the above examples that several different free radical catalysts were used. In addition to those catalysts employed above, other free radical catalysts that may be used include: Benzoyl peroxide; lauroyl peroxide; tertbutyl perbenzoate; 1-hydroxycyclohexyl hydroperoxide; tert-butyl peroxide; tert-butyl hydroperoxide; 3-carboxypropionyl peroxide; acetyl peroxide; 2,2'-azodiisobutyramindine dihydrochloride; 2,2'-azodiisobutyronitrile; 2,2'-azobix(2,4-dimethyl-4-methoxyvaleronitrile); sodium peroxide; barium peroxide; hydrogen peroxide; ammonium persulfate; potassium persulfate; and the like.

A copolymer of N-hexafluoroisopropanol acrylamide and perfluoroisobutyl acrylate (1:1 mole ratio) was tested to show its efficacy as an oil-and-water repellent for various fabrics. This product was applied to various fabrics with a roller, dried 5 minutes at 250° F., cured for 5 minutes at 320° F., and tested for water-and-oil repellency. The water repellency was measured according to a standard test of the American Association of Textile Chemists and Colorists, test method AATCC–22–1961. Basically, the test involves the sprinkling of fabrics held on an embroidery hoop at a 45° incline with 1 quart of water at 80° F. from a clothes sprinkler held about 8 inches above the fabric. A rating of 100 indicates no penetration of the water, a rating of 90 shows a slight wetting of the fabric, while a rating of 50 shows slight water repellency and a rating of zero shows complete penetration and wetting.

The oil repellency was measured according to the "3M Oil Repellency Test." This test is described in the April 1962 issue of the Textile Research Journal at pages 323–324. Basically, the test involves applying mixtures of light mineral oil and n-heptane to swatches of treated cloth. The failure to absorb a drop of 100% heptane in three minutes results in a rating of 150, while failure to absorb a drop of 100% mineral oil gives a rating of 50. Absorption of the mineral oil results in a rating of zero. Ratings between 50 and 150 represent various mixtures of mineral oil and n-heptane. Thus, a rating of 110 indicates no penetration by a mixture of 60% n-heptane and 40% mineral oil. Generally, a rating in the range of 50–70 indicates only a fair resistance to staining, 80–90 indicates good resistance, and 100 or above shows outstanding resistance.

The N-hexafluoroisopropanol acrylamide copolymer at a dosage concentration of 40% by weight showed a water-repellent C rating of 80 and an oil-repellent C rating of 100 on cotton. In the case of sateen fabric the water-repellency rating was 80 and the oil-repellency rating for this polymer on sateen was 80.

Having thus described my invention, it is claimed as follows:

1. N-hexafluoroisopropanol acrylamide having the formula:

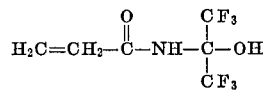

2. A method for preparing N-hexafluoroisopropanol acrylamide which comprises reacting acrylamide with at least one mole of hexafluoroacetone at a temperature below −27° C.

3. The method of claim 1 where the reaction is conducted in a glycol ether solvent.

References Cited

UNITED STATES PATENTS

| | | | |
|---|---|---|---|
| 2,760,977 | 8/1956 | Feuer et al. | 260—561 |
| 2,782,184 | 2/1957 | Husted et al. | 260—89.7 |
| 2,957,914 | 10/1960 | Halpern et al. | 260—561 |

LEWIS GOTTS, Primary Examiner

E. G. LOVE, Assistant Examiner

U.S. Cl. X.R.

252—8.8; 106—2; 260—78.5, 80.3, 85.5, 85.7, 87.5, 88.1